April 23, 1963
E. J. JETTEN
3,086,567
SAWING MACHINE COMPRISING A CIRCULAR SAW
PROVIDED WITH AN INTERNAL TOOTHING
Filed June 29, 1961
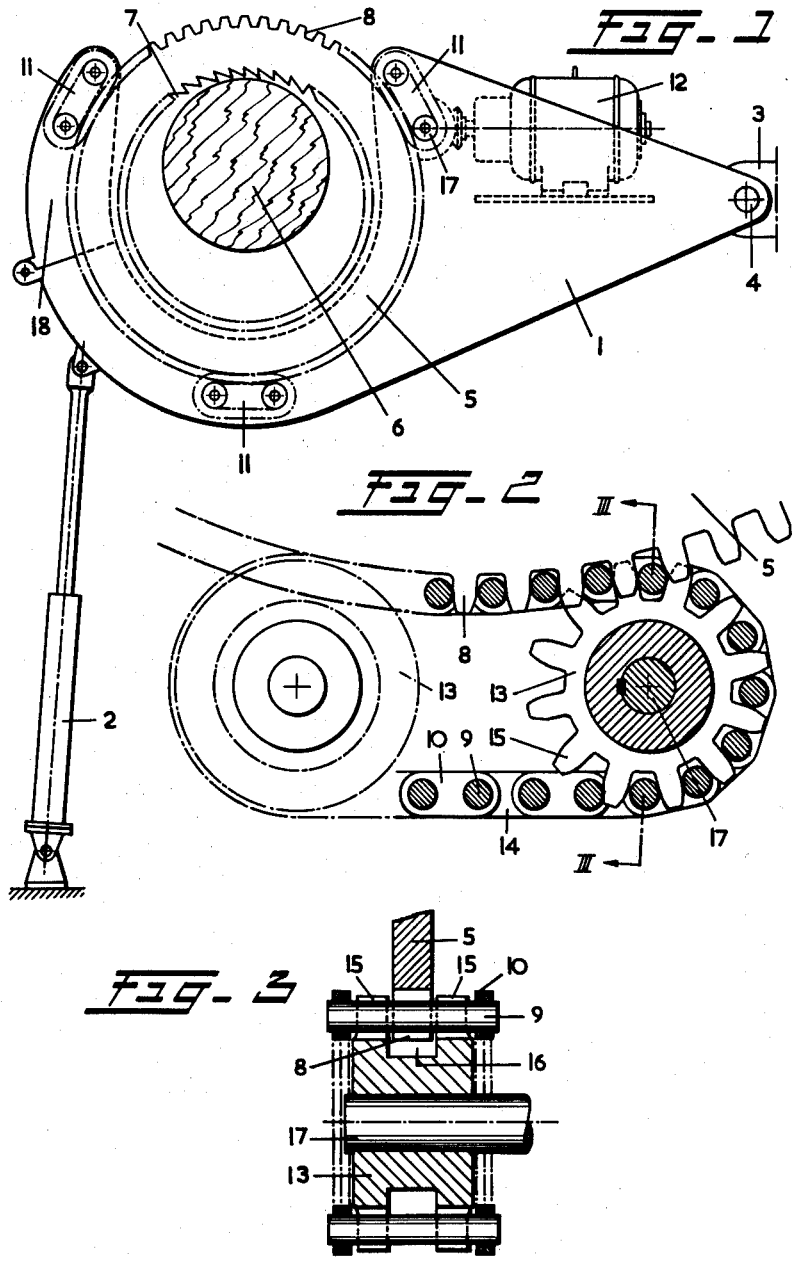
INVENTOR.
EVERT JOHANNES JETTEN
BY
Nenderoth Lind & Ponack
ATTORNEYS

United States Patent Office 3,086,567
Patented Apr. 23, 1963

3,086,567
SAWING MACHINE COMPRISING A CIRCULAR SAW PROVIDED WITH AN INTERNAL TOOTHING
Evert Johannes Jetten, Rotterdam, Netherlands, assignor of one-half to Willem Koelega, Rotterdam, Netherlands
Filed June 29, 1961, Ser. No. 120,765
Claims priority, application Netherlands June 30, 1960
3 Claims. (Cl. 143—44)

The present invention relates to a sawing machine comprising a circular saw, a motor for driving said saw, a swivelling frame carrying said circular saw and said motor and a hydraulic or pneumatic means for moving said frame to a position in which said saw engages a work piece fixed relative to the frame of the machine.

Sawing machines of this type are known and normally the saw blade thereof is a circular disc having an external toothing, which disc is centrally clamped between two hub plates fixed on a driven shaft, which hub plates assist in stiffening the saw blade. Seeing that the saw blade is to transmit a rather large couple from the driven shaft to the toothing actual practice has shown that the stiffening hub plates are to have a diameter which amounts to at least one-third of the diameter of the saw blade. This has for its result that for the capacity of the sawing machine, by which is understood here the maximum depth of the saw cut that can be made or the maximum thickness of the work that can be sawn through, only one-third of the diameter of the saw blade is available.

The object of the invention is to provide a sawing machine of the type described, the capacity of which is appreciably larger for a given external diameter of the saw blade. To achieve this end according to the invention the saw blade is annular and provided with internal saw teeth, the thickness of the blade being constant throughout or largest adjacent said teeth and the blade being supported relative to the frame in only three points distributed over the outer periphery of said blade by supporting means, at least one of which means also serves for driving the blade.

The radial width of the annular saw blade need not be large from a viewpoint of the stiffness required for the couple that is to transmit the driving force to the saw teeth, because said couple decreases according as said width decreases. Accordingly, the internal diameter of the annular saw blade provided with an internal toothing may therefore amount to at least two-thirds of the external diameter of the blade, which internal diameter can be utilized substantially entirely for the capacity of the machine in the sense indicated above.

It should be noted that a sawing machine comprising a circular saw with an internal toothing is known per se. In said known machine the saw blade has its external rim clamped in a drum secured on the driven shaft. Accordingly, the capacity of this machine is at most as large as the radial width of the annular saw blade and, as also the internal diameter of the blade limits said capacity it will never exceed one-third of the external diameter of the annular saw blade.

The invention will be elucidated hereinafter with reference to the accompanying drawings showing an embodiment. In said drawings:

FIGURE 1 is a side-view of the swivelling frame with the saw blade mounted therein;

FIGURE 2 is a large scale view of one of the supporting means for the saw blade and FIGURE 3 is a section on line III—III in FIGURE 2.

In the drawings the numeral 1 designates the swivelling frame which for the feed motion of the saw is adapted to swivel under the control of a hydraulic or pneumatic means 2 about the swivel pin 4 journalled in the frame 3 of the machine. The annular saw blade is designated by 5, 6 designates the work piece to be sawn, which work piece has been fixed relatively to the machine frame in a manner not shown.

The saw blade 5 is provided with internal saw teeth 7 and with an external toothing 8 which is adapted to be put in mesh with the rollers 9 of a chain comprising rollers 9 and links 10 (FIGURE 2). Furthermore the saw blade is so formed that it has its largest thickness adjacent the internal toothing 7.

The swivelling frame 1 has the shape of a hook provided with a shank, three points of support 11 for the saw blade 5 being provided on either side of the opening and in the middle of the bend of the hook. Said points of support are substantially uniformly distributed over the outer periphery of the saw blade 5. The shank of the hook at the same time carries the driving electric or hydraulic motor 12.

Each of the three points of support comprises two sprocket wheels 13 mounted on shafts 17 journalled in close proximity to each other in the swivelling frame 1, about which sprockets an endless chain 14 is trained. The sprockets 13 are of such a width that their teeth 15 are adapted to fittingly engage between the links 10 of the chain 14 and in their median plane they are provided with a groove 16 encircling them, which groove has a width which corresponds to or is a little larger than the width of the saw blade adjacent the external toothing 8 on said blade.

Accordingly the toothings 8 and 15 of the saw blade 5 and of the sprockets 13 respectively are independently of each other in mesh with the chain 14, said toothings passing each other in axial direction and the saw blade 5 being laterally guided by the walls of the groove 16. This offers the advantage that the saw blade is not supported and driven respectively by one or a few teeth of each supporting means, but by the entire length of one run of each of the chains 14.

At least one of the shafts 17 of at least one of the three supporting means 11 is driven by the motor 12. The other supporting means solely serves for supporting and guiding the saw blade 5.

In order to enable the saw blade to be removed from the machine a portion 18 at the free end of the hook-shaped swivelling frame 1, which portion carries one supporting means 11, is so secured to said frame as to be tiltable.

By means of the machine according to the invention work pieces having a cross-section which is only a little smaller than the opening in the annular saw blade may be sawn through without this presenting any difficulties. A bar-shaped body of said cross-section, from which a number of pieces of a certain length are to be cut off may be inserted through the opening in the annular saw blade and each time after cutting off one length it is moved over the required length and is fixed again in its new position. There is nothing to interfere with the free movement of said body through the opening in the annular saw blade.

I claim:

1. A sawing machine comprising a movable frame, a plurality of at least three blade supporting means mounted on said frame and spaced from each other and extending around at least 180° of an arc on said frame, an annular disc saw having saw teeth on the internal periphery thereof and rotatably supported in said supporting means, said supporting means engaging the external periphery and the lateral sides of said saw blade for supporting the saw blade during rotation, and one of said supporting means engaging the external periphery of said saw blade in driving engagement, and a driving motor coupled to said one supporting means and driving said supporting means and saw blade.

2. A sawing machine comprising a movable frame, three blade supporting means mounted on said frame and spaced from each other and extending around at least 180° of an arc on said frame, an annular disc saw having saw teeth on the internal periphery thereof and teeth on the external periphery thereof and rotatably supported in said supporting means, said supporting means engaging the toothed external periphery and the lateral sides of said blade for supporting the saw blade during rotation, and at least one of said supporting means having tooth engaging means engaged with said teeth on the external periphery of said saw for driving said saw, and a driving motor connected to said tooth engaging means on said one supporting means.

3. A sawing machine as claimed in claim 2 in which each of said supporting means comprises a pair of sprocket wheels spaced from each other, each sprocket wheel having pairs of teeth spaced axially of the sprocket wheel around the periphery thereof and having a groove around the periphery of the wheels between the teeth in each pair, and each of said supporting means having tooth engaging means, said tooth engaging means comprising a roller chain around the pair of sprocket wheels and having rollers with links connecting the ends of the rollers to each other, the rollers engaging the teeth on said sprocket wheels and being engaged with the teeth on the periphery of said annular disc saw, said teeth on said disc saw extending between the rollers in said roller chain and extending between the teeth of the pairs of teeth on said sprocket wheels and into the peripheral groove on said sprocket wheels, said driving motor being connected to one of the sprocket wheels in one of said pairs of sprocket wheels.

References Cited in the file of this patent

UNITED STATES PATENTS

| | | |
|---|---|---|
| 773,118 | Carter | Oct. 25, 1904 |
| 2,490,255 | Chase | Dec. 6, 1949 |
| 2,594,548 | Flick | Apr. 29, 1952 |
| 2,599,495 | Smith | June 3, 1952 |

FOREIGN PATENTS

| | | |
|---|---|---|
| 54,335 | Sweden | Apr. 18, 1923 |